(12) United States Patent
Lenhard et al.

(10) Patent No.: US 10,972,004 B2
(45) Date of Patent: Apr. 6, 2021

(54) VOLTAGE CONVERTER AND METHOD FOR VOLTAGE CONVERSION

(71) Applicant: ams AG, Premstaetten (AT)

(72) Inventors: Herbert Lenhard, Graz (AT); Manfred Lueger, Stainz (AT)

(73) Assignee: AMS AG, Premstaetten (AT)

( * ) Notice: Subject to any disclaimer, the term of this patent is extended or adjusted under 35 U.S.C. 154(b) by 0 days.

(21) Appl. No.: 16/478,758

(22) PCT Filed: Jan. 26, 2018

(86) PCT No.: PCT/EP2018/051925
§ 371 (c)(1),
(2) Date: Jul. 17, 2019

(87) PCT Pub. No.: WO2018/138244
PCT Pub. Date: Aug. 2, 2018

(65) Prior Publication Data
US 2019/0341846 A1 Nov. 7, 2019

(30) Foreign Application Priority Data
Jan. 30, 2017 (EP) .................................... 17153727

(51) Int. Cl.
*H02M 3/07* (2006.01)
(52) U.S. Cl.
CPC ...... *H02M 3/073* (2013.01); *H02M 2003/075* (2013.01)
(58) Field of Classification Search
CPC .. H02M 3/073; H02M 3/07; H02M 2003/075; H02M 7/103; H02M 7/10;
(Continued)

(56) References Cited

U.S. PATENT DOCUMENTS 6,483,282 B1   11/2002  Bayer
2003/0184360 A1* 10/2003 Wang ................... H02M 3/073
                                                                    327/536
(Continued)

FOREIGN PATENT DOCUMENTS

CN        1734908 A    2/2006
CN      101159412 A    4/2008
(Continued)

OTHER PUBLICATIONS

European Patent Office, International Search Report for PCT/EP2018/051925 dated Apr. 16, 2018.
(Continued)

*Primary Examiner* — Long Nguyen
(74) *Attorney, Agent, or Firm* — MH2 Technology Law Group LLP

(57) ABSTRACT

A voltage converter includes a first to a third capacitor, a supply terminal, a first and a second clock terminal and a transfer arrangement, wherein a first electrode of the first capacitor is connected to the first clock terminal and a second electrode of the first capacitor is connected to a first node of the transfer arrangement, wherein a first electrode of the second capacitor is connected to the second clock terminal and a second electrode of the second capacitor is connected to a second node of the transfer arrangement, and wherein a first electrode of the third capacitor is permanently and directly connected to the second electrode of the first capacitor and a second electrode of the third capacitor is connected to a third node of the transfer arrangement.

15 Claims, 7 Drawing Sheets

(58) Field of Classification Search
CPC ........... H02M 7/106; H02M 2003/076; H02M 2003/077; G11C 5/145
See application file for complete search history.

(56) References Cited

U.S. PATENT DOCUMENTS

| | | |
|---|---|---|
| 2008/0079480 A1 | 4/2008 | Utsunomiya |
| 2009/0016084 A1 | 1/2009 | Trattler |
| 2014/0068301 A1 | 3/2014 | Watanabe |

FOREIGN PATENT DOCUMENTS

| | | |
|---|---|---|
| CN | 102957315 A | 3/2013 |
| DE | 102006060011 | 7/2008 |
| FR | 2884072 | 10/2006 |
| FR | 2884072 A1 * | 10/2006 |
| JP | 2001157437 A | 6/2001 |

OTHER PUBLICATIONS

Wikipedia article "Voltage multiplier" retrieved from the internet on Dec. 20, 2016.

Moisiadis, Y. et al.: "Charge Pump Circuits for Low-voltage Applications" VLSI Design, Hindawi Publishing Corporation, US—vol. 15, No. 1, Jan. 2002, pp. 477-483, XP002667780.

Tu, Songyi Office Action issued in Chinese Patent Application No. 2018800091454 dated Nov. 16, 2020 with English language translation (16 pages).

\* cited by examiner

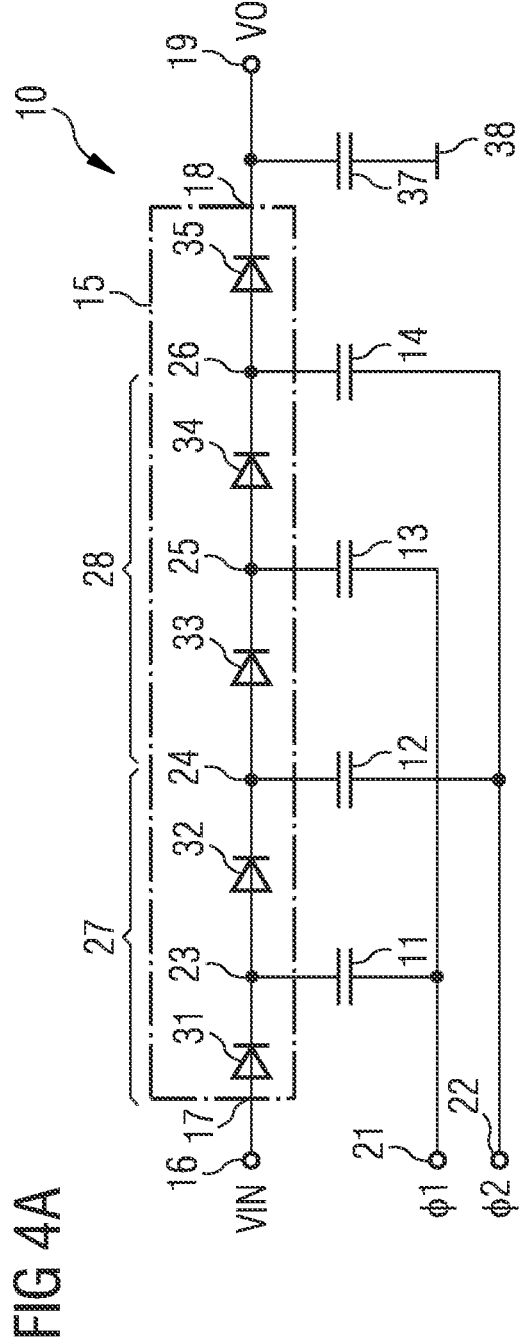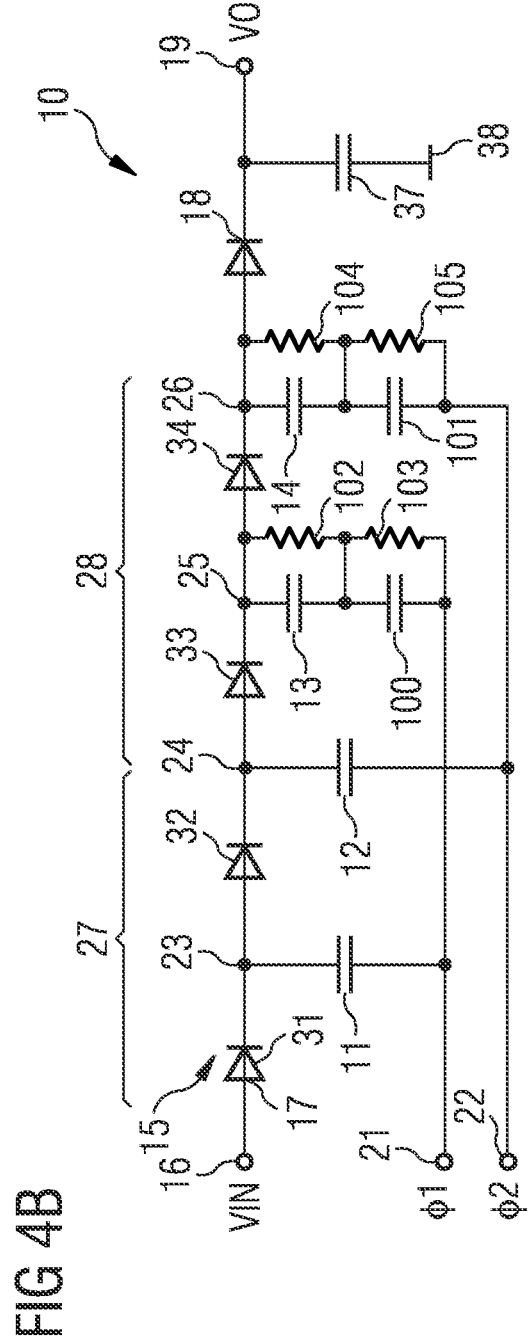

VOLTAGE CONVERTER AND METHOD FOR VOLTAGE CONVERSION

CROSS-REFERENCE TO RELATED APPLICATIONS

The present application is the national stage entry of International Patent Application No. PCT/EP2018/051925, filed on Jan. 26, 2018, which claims the benefit of priority of European Patent Application No. 17153727.7, filed on Jan. 30, 2017, all of which are hereby incorporated by reference in their entirety for all purposes.

BACKGROUND OF THE INVENTION

The present patent application is related to a voltage converter and a method for voltage conversion.

Voltage converters often convert a DC voltage into another DC voltage. A voltage converter can be realized as a charge pump comprising several capacitors that are charged and discharged during operation. The capacitors may have a maximum operating voltage.

SUMMARY OF THE INVENTION

In an embodiment, a voltage converter comprises a first, a second and a third capacitor, a first and a second clock terminal, a supply terminal and a transfer arrangement. An input of the transfer arrangement is coupled to the supply terminal and an output of the transfer arrangement is coupled to an output terminal of the voltage converter. A first electrode of the first capacitor is connected to the first clock terminal and a second electrode of the first capacitor is connected to a first node of the transfer arrangement. A first electrode of the second capacitor is connected to the second clock terminal and a second electrode of the second capacitor is connected to a second node of the transfer arrangement. A first electrode of the third capacitor is permanently and directly connected to the second electrode of the first capacitor and a second electrode of the third capacitor is connected to a third node of the transfer arrangement.

Advantageously, the first and the second clock terminal are not directly connected to the third capacitor. Thus, during operation a reference potential is not provided to the first or the second electrode of the third capacitor. The voltage difference between the two electrodes of the third capacitor is equal or less than the twofold of an input voltage tapped at the supply terminal.

In an embodiment, the first and the second capacitor both have a first capacitance value and the third capacitor has a second capacitance value. The first capacitance value is larger than the second capacitance value.

In an embodiment, the voltage converter comprises a fourth capacitor having a first electrode permanently and directly connected to the second electrode of the second capacitor and a second electrode connected to a fourth node of the transfer arrangement.

In an embodiment, the voltage converter comprises at least a Nth capacitor having a first electrode permanently and directly connected to the second electrode of the (N−2) th capacitor and a second electrode connected to a Nth node of the transfer arrangement, wherein N is larger than 4. N may be 5, 6 and so on. Thus, a first electrode of the fifth capacitor is permanently and directly connected to the second electrode of the third capacitor. A first electrode of the sixth capacitor is permanently and directly connected to the second electrode of the fourth capacitor and so forth.

In an embodiment, the transfer arrangement comprises a first, a second and a third circuit element. The first circuit element couples the supply terminal to the first node, the second circuit element couples the first node to the second node and the third circuit element couples the second node to the third node.

In an embodiment, the third node is coupled to the output of the transfer arrangement by a final circuit element or by a series circuit of the final circuit element and at least a further circuit element.

In an embodiment, each of the first, the second and the third circuit element is realized as a diode. The final circuit element and/or further circuit elements may also be realized as a diode.

In an alternative embodiment, each of the first, the second and the third circuit element is realized as a field-effect transistor. The final circuit element and/or further circuit elements may also be realized as a field-effect transistor.

In an embodiment, the voltage converter comprises an output capacitor coupling the output of the transfer arrangement to a reference potential terminal.

In an alternative embodiment, the voltage converter is free from any capacitor having a first electrode directly connected to the output of the transfer arrangement and a second electrode directly connected to the reference potential terminal.

In an embodiment, the voltage converter comprises a first switching arrangement having a first and a second switch. The first switch couples the input of the transfer arrangement to the first node. The second switch couples the first node to a first intermediate node of the transfer arrangement. The transfer arrangement may comprise the first switching arrangement.

In a further development, the first switching arrangement comprises a third switch that couples the second node to the first intermediate node of the transfer arrangement.

The first switching arrangement may optionally comprise a fourth switch that couples the input of the transfer arrangement to the second node.

In an embodiment, the voltage converter comprises a first back-up capacitor coupling the first intermediate node to the reference potential terminal. Advantageously, the first back-up capacitor may be useful for storing energy. The first back-up capacitor may reduce a ripple in an output voltage of the voltage converter.

In an embodiment, the voltage converter comprises a second switching arrangement having a fifth and a sixth switch. The fifth switch couples the first intermediate node to the third node. The sixth switch couples the third node to a second intermediate node of the transfer arrangement. The transfer arrangement may comprise the second switching arrangement.

The second switching arrangement may optionally comprise a seventh switch that couples the fourth node to the second intermediate node of the transfer arrangement.

The second switching arrangement may optionally comprise an eighth switch coupling the first intermediate node to the fourth node.

In an embodiment, the voltage converter comprises a second back-up capacitor coupling the second intermediate node to the first intermediate node. Advantageously, a voltage across the first back-up converter may be equal to a voltage across the second back-up converter, for example in a steady-state of operation of the voltage converter. Since the second back-up capacitor is not connected to ground but to the first intermediate node, a voltage across the first back-up capacitor and across the second back-up capacitor may be approximately equal. Advantageously, it may be not necessary to realize back-up capacitors with capacitors that can withstand a high voltage. The voltage converter may be realized free of any high voltage capacitor.

In an embodiment, the voltage converter is realized as a Dickson charge pump capacitor arrangement. The voltage converter is configured for generating a higher output voltage at the output terminal. The voltage converter is designed as an internal charge pump for an output voltage above the maximum operating voltage of the capacitors used. The voltage converter provides an improved charge pump efficiency and a reduced size.

In an embodiment, a method for voltage conversion comprises providing an input voltage to an input of a transfer arrangement, providing a first clock signal to a first electrode of a first capacitor, providing a second clock signal to a first electrode of a second capacitor and tapping an output voltage at an output of the transfer arrangement. A second electrode of the first capacitor is connected to a first node of the transfer arrangement. A second electrode of the second capacitor is connected to a second node of the transfer arrangement. A first electrode of a third capacitor is permanently and directly connected to the second electrode of the first capacitor. A second electrode of the third capacitor is connected to a third node of the transfer arrangement.

Advantageously, the first and the second clock signal are not directly applied to the third capacitor. Thus, during operation a reference potential is not provided to the first or the second electrode of the third capacitor. The voltage difference between the two electrodes of the third capacitor is equal or less than twice of the input voltage. Thus, the voltage across the third capacitor is reduced.

In an embodiment, pulses of the first clock signal and pulses of the second clock signal alternate. One pulse of the second clock signal is between two pulses of the first clock signal and so forth.

In an embodiment, the voltage converter is realized free of any resistor. Electrical losses are reduced by avoiding resistors.

In an embodiment, a method for voltage conversion comprises providing an input voltage to an input of the transfer arrangement, providing a first clock signal to an outer terminal of a first series circuit of capacitors, providing a second clock signal to an outer terminal of a second series circuit of capacitors and tapping an output voltage at an output of the transfer arrangement.

In an embodiment, the first series of capacitors comprises a first and a third capacitor. The second series of capacitors comprises a second and a fourth capacitor.

In an embodiment, a further outer terminal of the first series circuit of capacitors and a node or nodes between capacitors of the first series circuit of capacitors and a further outer terminal of the second series circuit of capacitors and a node or nodes between capacitors of the second series circuit of capacitors are connected to different nodes of the transfer arrangement. Thus, charges are provided from the first series of capacitors to the second series of capacitors via the transfer arrangement at a pulse of the first clock signal and charges are provided from the second series of capacitors to the first series of capacitors via the transfer arrangement at a pulse of the second clock signal.

BRIEF DESCRIPTION OF THE DRAWINGS

The following description of figures of exemplary embodiments may further illustrate and explain aspects of the invention. Devices and circuit parts with the same structure and the same effect, respectively, appear with equivalent reference symbols. In so far as devices or circuit parts correspond to one another in terms of their function in different figures, the description thereof is not repeated for each of the following figures.

FIGS. 4A to 4C show exemplary embodiments of voltage converters and of signals that can be tapped at voltage converters.

DETAILED DESCRIPTION

Figure 1A:
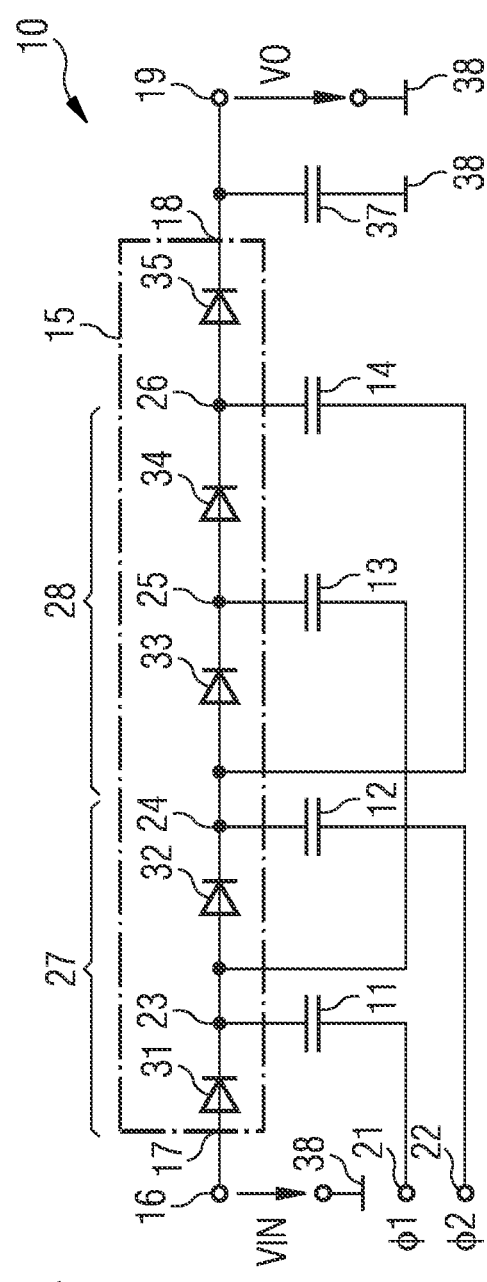
FIGS. 1A to 1C show exemplary embodiments of a voltage converter.

FIG. 1A shows an exemplary embodiment of a voltage converter 10 that comprises a first, a second and a third capacitor 11 to 13 and a transfer arrangement 15. The voltage converter 10 comprises a supply terminal 16 coupled to an input 17 of the transfer arrangement 15. The supply terminal 16 may be connected to a not-shown voltage source. An output 18 of the transfer arrangement 15 is connected to an output terminal 19 of the voltage converter 10. Moreover, the voltage converter 10 comprises a first and a second clock terminal 21, 22. A first electrode of the first capacitor 11 is connected to the first clock terminal 21. A second electrode of the first capacitor 11 is connected to a first node 23 of the transfer arrangement 15. A first electrode of the second capacitor 12 is connected to the second clock terminal 22. A second electrode of the second capacitor 12 is connected to a second node 24 of the transfer arrangement 15. A first electrode of the third capacitor 13 is connected to the second electrode of the first capacitor 11. Furthermore, a second electrode of the third capacitor 13 is connected to a third node 25 of the transfer arrangement 15.

Moreover, the voltage converter 10 may comprise a fourth capacitor 14 having a first electrode that is connected to the second electrode of the second capacitor 12. A second electrode of the fourth capacitor 14 may be connected to a fourth node 26 of the transfer arrangement 15.

The first electrode of the third capacitor 13 is permanently and directly connected to the second electrode of the first capacitor 11. Correspondingly, the first electrode of the fourth capacitor 14 is permanently and directly connected to the second electrode of the second capacitor 12. The first and the second electrode of the third capacitor 13 is free from a direct connection to the first or the second clock terminal 21, 22. Correspondingly, the first and the second electrode of the fourth capacitor 14 is free from a direct connection to the first or the second clock terminal 21, 22.

The transfer arrangement 15 comprises a first, a second and a third circuit element 31 to 33. The first circuit element 31 couples the input 17 of the transfer arrangement 15 to the first node 23. The second circuit element 32 couples the first node 23 to the second node 24. Correspondingly, the third circuit element 33 couples the second node 24 to the third node 25. A fourth circuit element 34 couples the third node 25 to the fourth node 26. A final circuit element 35 couples the last node of the transfer arrangement 15 to the output 18 of the transfer arrangement 15. Since, in the embodiment shown in FIG. 1A, the last node is the fourth node 26, the final circuit element 35 couples the fourth node 26 to the output 18 of the transfer arrangement 15.

Thus, the transfer arrangement 15 is realized as a series circuit of circuit elements 31 to 34 and the final circuit element 35. In the example shown in FIG. 1A, the transfer arrangement 15 is realized as a series circuit of the first to the fourth circuit element 31 to 34 and the final circuit element 35. Each of the circuit elements 31 to 34 and the final circuit element 35 are realized as a diode. The transfer arrangement 15 is implemented as a series circuit of diodes. The diodes are oriented in such a way that a current flow is possible from the input 17 of the transfer arrangement 15 to the output 18 of the transfer arrangement 15. Each of the diodes may be implemented as a pn-junction. At each of the diodes, the anode is directed to the input 17 and the cathode is oriented to the output 18 of the transfer arrangement 15.

The voltage converter 10 comprises an output capacitor 37 that couples the output terminal 19 of the voltage converter 10 to a reference potential terminal 38.

The voltage converter 10 comprises a first and a second stage 27, 28. The first stage 27 comprises the first and the second capacitor 11, 12 and the first and the second circuit element 31, 32. Correspondingly, the second stage 28 comprises the third and the fourth capacitor 13, 14 and the third and the fourth circuit element 33, 34.

The first and the second capacitor 11, 12 may both have a first capacitance value C1. The third and the fourth capacitor 13, 14 may both have a second capacitance value C2. The first capacitance value C1 may be larger than the second capacitance value C2, thus C2<C1. A relationship between C1 and C2 may be:

$$1.6 \cdot C2 < C1 < 2.4 \cdot C2$$

For example: $C1 = 2 \cdot C2$

By the realization of the first capacitor 11 with a higher capacitance value than the third capacitor 13, the voltages across the first and the third capacitor 11, 13 are approximately equal. A time for the rise of the output voltage VO at the output terminal 19 is reduced.

In an alternative, not shown embodiment, the voltage converter 10 comprises further capacitors and circuit elements.

Figure 1B:
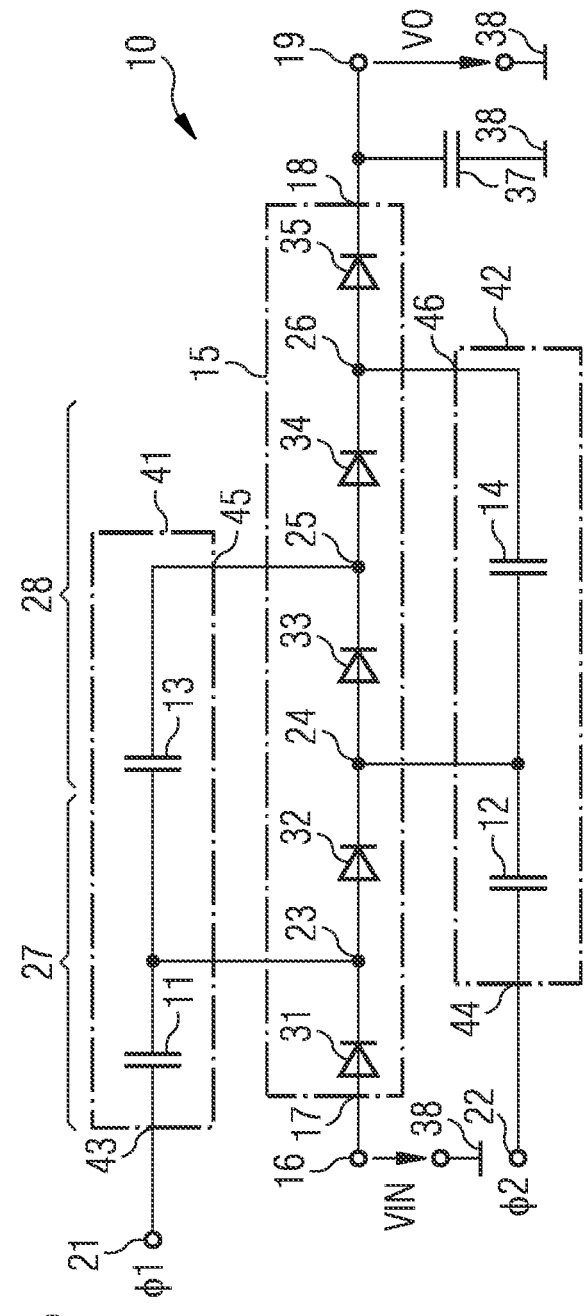

FIG. 1B shows a further exemplary embodiment of the voltage converter 10. The circuit parts and the couplings between the circuit parts of the voltage converter 10 shown in FIG. 1B are identical to the circuit parts and couplings of the voltage converter shown in FIG. 1A. The voltage converter 10 comprises a first series circuit of capacitors 41 and a second series circuit of capacitors 42. The first series circuit of capacitors 41 comprises the first and the third capacitor 11, 13. The first clock terminal 21 is connected to an outer terminal 43 of the first series circuit of capacitors 41. A further outer terminal 45 and nodes between the capacitors 11, 13 of the first series circuit of capacitors 41 are connected to nodes of the transfer arrangement 15. Thus, the first series circuit of capacitors 41 is connected to the first and the third node 23, 25.

Correspondingly, the second series circuit of capacitors 42 comprises the second and the fourth capacitor 12, 14. The second clock terminal 22 is connected to an outer terminal 44 of the second series circuit of capacitors 42. Nodes between the capacitors 12, 14 of the second series circuits of capacitors 42 and a further outer terminal 46 of the second series circuit of capacitors 42 are connected to nodes of the transfer arrangement 15. More specifically, the second series circuit of capacitors 42 is connected to the second and the fourth node 24, 26.

In case the voltage converter 10 has a fifth capacitor, the first series circuit of capacitors 41 comprises the fifth capacitor. Additionally, the second series circuit of capacitors 42 may comprise a sixth capacitor.

The first series circuit of capacitors 41 has a first number N1 of capacitors. Correspondingly, the second series circuit of capacitors 42 has a second number N2 of capacitors. The first number N1 and the second number N2 follow the subsequent equations:

$$2 \leq N1 = N2 \text{ or } 2 \leq N1 = N2 + 1$$

The first series of capacitors 41 is free from a resistor, diode or transistor connecting one capacitor to the other capacitor of the first series of capacitors 41. The connections between the different capacitors of the first series circuit of capacitors 41 only consist of connecting lines. Correspondingly, the second series of capacitors 42 is free from a resistor, diode or transistor connecting one capacitor to the other capacitor of the second series of capacitors 42. The connections between the different capacitors of the second series circuit of capacitors 42 only consist of connecting lines.

An input voltage VIN is supplied to the supply terminal 16. At the output terminal 19 of the voltage converter 10 an output voltage VO is provided. A first clock signal $\Phi1$ is applied to the first clock terminal 21 and a second clock signal $\Phi2$ is applied to the second clock terminal 22. The height of the pulses of the first and the second clock signal $\Phi1$, $\Phi2$ may be equal to the input voltage VIN.

Figure 1C:
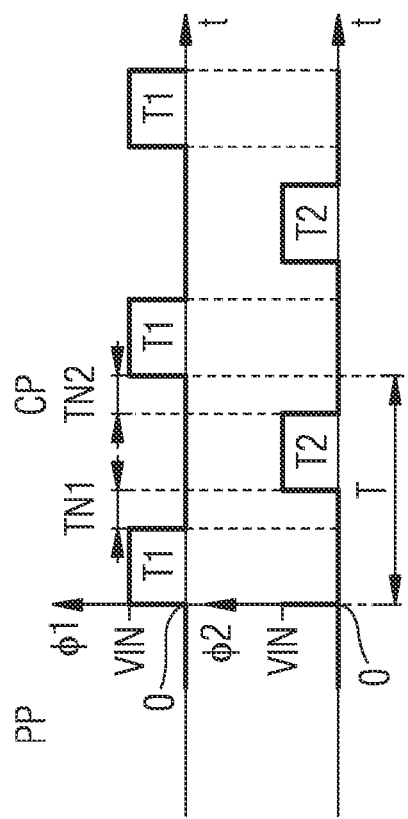

FIG. 1C shows an exemplary embodiment of the first and the second clock signal $\Phi1$, $\Phi2$ as a function of a time t. The voltage converter 10 has a pre-charging mode PM and a charging mode CM. The pre-charging mode PM could be called pre-charging phase. The charging mode CM could be named charging phase. The charging mode CM follows the pre-charging mode PM. In the pre-charging mode PM, the input voltage VIN is provided to the voltage converter 10 via the supply terminal 16 and charges the first capacitor 11.

In the charging mode CM, the pulses of the first clock signal $\Phi1$ and of the second clock signal $\Phi2$ alternate. Thus, a pulse of the second clock signal $\Phi2$ is between two pulses of the first clock signal $\Phi1$. Correspondingly, a pulse of the first clock signal $\Phi1$ is between two pulses of the second clock signal $\Phi2$ (with the exception of the first pulse of the first clock signal $\Phi1$). A pulse of the first clock signal $\Phi1$ has a first duration T1 and a pulse of the second clock $\Phi2$ signal has a second duration T2. The first duration T1 and the second duration T2 may be equal.

There is a non-overlap time TN1 between a pulse of the first clock signal $\Phi1$ and the following pulse of the second clock signal $\Phi2$. There is also a further non-overlap time TN2 between a pulse of the second clock signal $\Phi2$ and the following pulse of the first clock signal $\Phi1$. The non-overlap time TN1 and the further non-overlap time TN2 may have the same duration. Thus, a period T of the clock signals $\Phi1$, $\Phi2$ can be calculated according to the following equation:

$$T = T1 + TN1 + T2 + TN2$$

Thus, the period T is repeated periodically. In the charging mode CM, the voltage converter 10 operates using four phases. A pulse of the first clock signal $\Phi1$ forms a first phase. The non-overlap time TN1 realizes a second phase. A pulse of the second clock signal $\Phi2$ forms a third phase. The further non-overlap time TN2 realizes a fourth phase. Advantageously, a current flow backwards from the output terminal 19 to the input 17 or any other current flowing in a direction that is not desired can be avoided by using non-overlap times TN1, TN2. Advantageously, the efficiency of the voltage converter 10 is increased by the non-overlap times TN1, TN2.

At the start of operation, in the pre-charging mode PM, the input voltage VIN is provided via the first circuit element 31 to the second electrode of the first capacitor 11. Thus, the input voltage VIN is provided between the two electrodes of the first capacitor 11. In the charging mode CM, by a pulse of the first clock signal Φ1, the input voltage VIN is provided to the first electrode of the first capacitor 11 and thus a voltage tapped at the second electrode of the first capacitor 11 rises to 2·VIN. Thus, charge flows from the second electrode of the first capacitor 11 via the second circuit element 32 to the second electrode of the second capacitor 12.

By a pulse of the second clock signal Φ2, the input voltage VIN is provided to the first electrode of the second capacitor 12 and thus a voltage tapped at the second electrode of the second capacitor 12 rises up to nearly three times of the input voltage VIN. Thus, charge flows from the second electrode of the second capacitor 12 via the third circuit element 33 to the second electrode of the third capacitor 13.

By the following pulses of the first clock signal Φ1, charge stored by the first and the third capacitor 11, 13 is provided via the transfer arrangement 15 to the second and the fourth capacitor 12, 14. Correspondingly, by pulses of the second clock signal Φ2, charge stored by the second and the fourth capacitor 12, 14 is provided via the transfer arrangement 15 to the third capacitor 13 and to the output capacitor 37.

In the pre-charging mode PM, the second electrode of the first and the second capacitor 11, 12 and both electrodes of the third and the fourth capacitor 13, 14 are charged to the input voltage VIN minus a voltage drop caused by the forward voltage drop VD of the diodes. During the charging mode CM, the output capacitor 37 may be charged up to the following value:

$$VO=(N+1)\cdot(VIN-VD)$$

$$N=N1+N2$$

wherein VO is the output voltage, VIN is the input voltage, VD is the forward voltage drop of one of the diodes and N is the number of the capacitors 11 to 14 of the first and the second series circuit of capacitors 41, 42. N is the number of capacitors 11 to 14 coupled to the transfer arrangement 15 besides the output capacitor 37. Thus, the number of diodes is N+1. An output current flowing from the voltage converter 10 to a not-shown load is neglected in the equations above.

Advantageously, a voltage balancing of the high voltage capacitors 13, 14 is provided by predecessor Dickson stages or stage. The predecessor Dickson stage comprises the first and the second capacitor 11, 12. All capacitors see the same forward voltage. The capacitors 13, 14 on the right side have the same capacitance value as in the standard Dickson charge pump shown in FIG. 4A without stacked capacitors. Just the capacitors 11, 12 in the predecessor stages must be doubled to get the same efficiency. In this example this results in a reduced size of the capacitor array of 6:10=−40%. This reduces also switching losses of the bottom plate parasitics of the two right capacitors 13, 14 by a factor of two. There is no longer a floating or high ohmic capacitor node. Therefore, there is no need for balancing resistors as shown in FIG. 4B that may increase the size of the voltage converter 10 and reduce efficiency.

Advantageously, the voltage converter 10 using diodes may be suitable for example at higher values of the input voltage VIN or the output voltage VO. At higher voltages, losses caused by the forward voltage drop VD of the diodes may only have a small effect.

Figure 2:
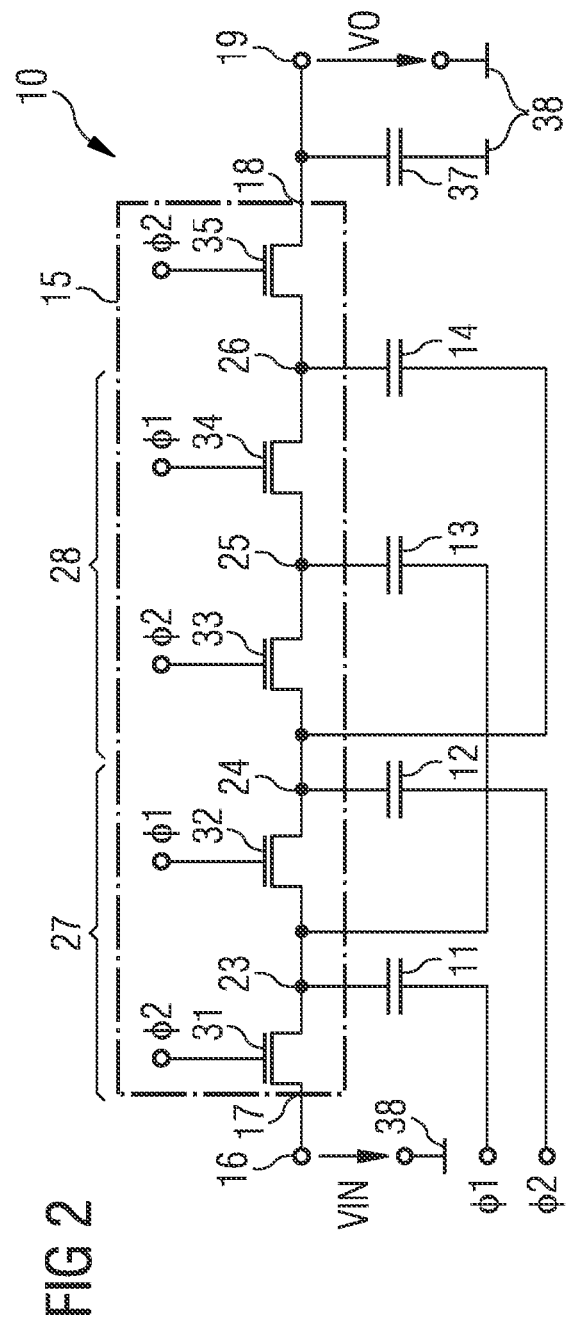
FIG. 2 shows a further exemplary embodiment of a voltage converter.

FIG. 2 shows an exemplary embodiment of the voltage converter 10 which is a further development of the voltage converter explained by FIGS. 1A to 1C. The first to the fourth circuit elements 31 to 34 and the final circuit element 35 are realized as transistors. The transistors may be implemented as field-effect transistors. For example, the transistors of the first to the fourth circuit element 31 to 34 and of the final circuit element 35 are realized as n-channel field-effect transistors. In this case, the transistors of the first and the third circuit element 31, 33 are controlled by the second clock signal Φ2 and the transistors of the second and the fourth circuit element 32, 34 are controlled by the first clock signal Φ1. The final circuit element 35 is controlled by the same signal that is used for the control of the second-last circuit element, namely in the case of FIG. 2 by the control signal of the third circuit element 33 that is the second clock signal Φ2. Two consecutive elements of the circuit elements 31 to 34, 35 are not controlled by the same clock signal Φ1, Φ2 and, thus, do not conduct at the same point of time.

In the voltage converter 10 shown in FIG. 2, in the pre-charging mode PP, the first to the fourth circuit element 31 to 34 and the final circuit element 35 may be set in a conducting state such that the output voltage VO rises up to the value of the input voltage VIN. Also the first electrodes of the first and the second capacitor 11, 12 are charged such that the input voltage VIN can be tapped between the two electrodes of the first capacitor 11 and between the two electrodes of the second capacitor 12. Additionally, the first and the second electrodes of third and the fourth capacitor 13, 14 are charged to the input voltage VIN in the pre-charging mode PP.

In case there is no load connected to the output terminal 19 of the voltage converter 10 and after several pulses of the first and the second clock signal Φ1, Φ2 and by neglecting a voltage drop at the transistors of the transfer arrangement 15, the output voltage VO may rise to the following value:

$$VO=(N+1)\cdot VIN \quad N=N1+N2$$

wherein N is the number of the capacitors 11 to 14 of the first and the second series circuit 41, 42. N is the number of capacitors 11 to 14 coupled to the transfer arrangement 15 besides the output capacitor 37.

Advantageously, a higher output voltage VO can be generated by the voltage converter 10 using transistors instead of diodes. Advantageously, the maximum of a voltage that is tapped between two electrodes of one of the capacitors 11 to 14 is twice the input voltage VIN. Thus, each of the capacitors 11 to 14 has to withstand only 2·VIN. Only the output capacitor 37 has to be fabricated such that it is suitable for operation at higher voltages.

In an alternative, not-shown embodiment, the transistors may be implemented as p-channel field-effect transistors. The first and the third circuit element 31, 33 may be controlled by the inverse signal of the second clock signal Φ2. Correspondingly, the second and the fourth circuit element 32, 34 may be controlled by the inverse of the first clock signal Φ1. The final circuit element 35 may be controlled by the same signal that is used for the control of the second-last circuit element, namely in the case of FIG. 2 by the control signal of the third circuit element 33 that is the inverse of the second clock signal Φ2.

Figure 3A:
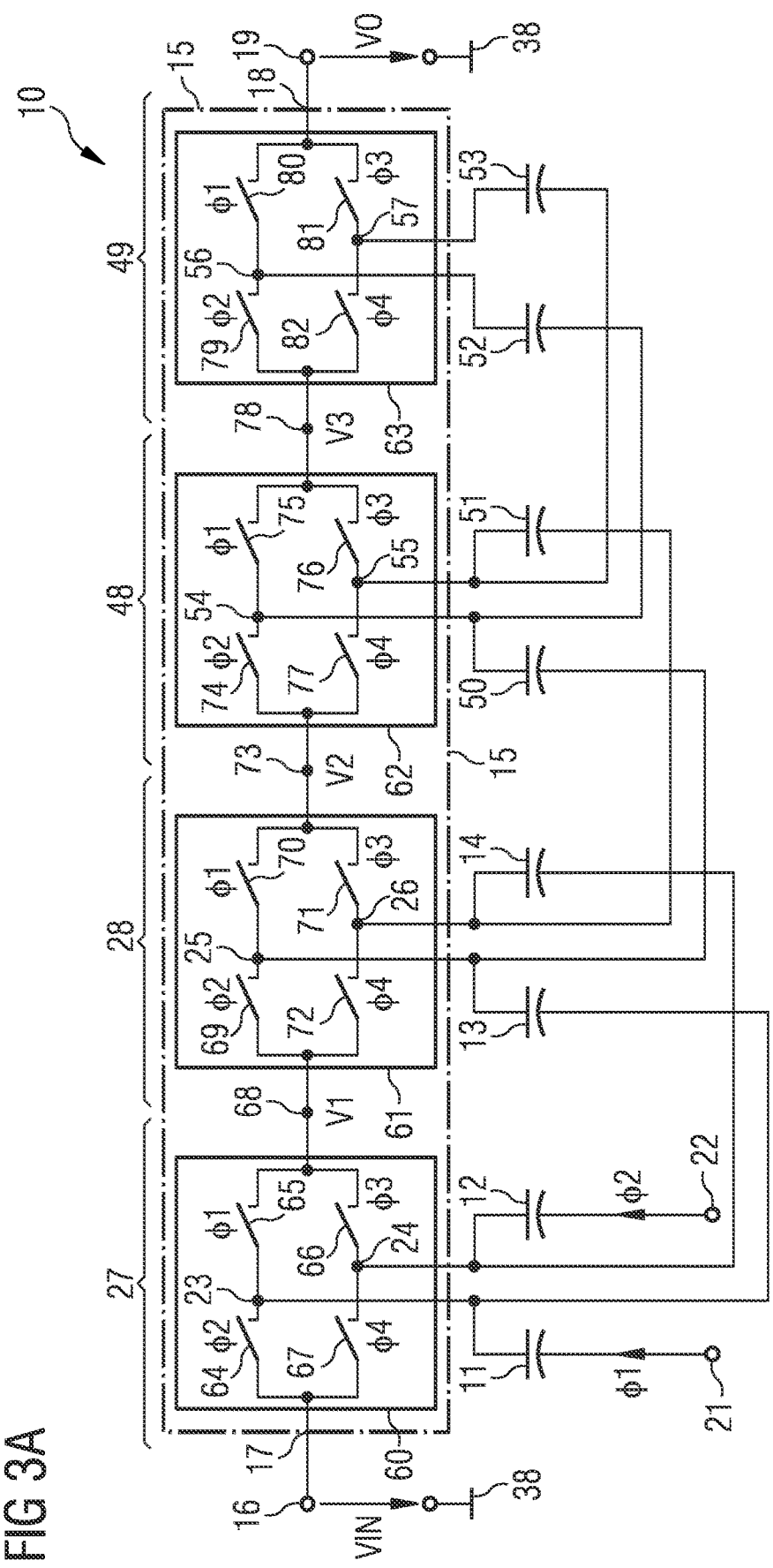
FIGS. 3A and 3B show further exemplary embodiments of a voltage converter.

FIG. 3A shows a further exemplary embodiment of the voltage converter 10 which is a further development of the embodiments shown in FIGS. 1A to 1C and 2. The voltage converter 10 comprises the number L of stages. The number L is at least 2. The first number N1 is equal to the second number N2 and is equal to the number L of stages. In the example shown in FIG. 3A, N1=N2=L=4. Thus, the voltage converter 10 comprises the first, the second, a third and a fourth stage 27, 28, 48, 49. The voltage converter 10 comprises a fifth to an eighth capacitor 50 to 53. The third stage 48 comprises the fifth and the sixth capacitor 50, 51. The fourth stage 49 comprises the seventh and the eighth capacitor 52, 53.

A first electrode of the fifth capacitor 50 is permanently and directly connected to the second electrode of the third capacitor 13. A second electrode of the fifth capacitor 50 is connected to a fifth node 54 of the transfer arrangement 15. A first electrode of the sixth capacitor 51 is directly and permanently connected to the second electrode of the fourth capacitor 14. A second electrode of the sixth capacitor 51 is connected to a sixth node 55 of the transfer arrangement 15. A first electrode of the seventh capacitor 52 is directly and permanently connected to the second electrode of the fifth capacitor 50. Moreover, a second electrode of the seventh capacitor 52 is connected to a seventh node 56 of the transfer arrangement 15. A first electrode of the eighth capacitor 53 is directly and permanently connected to the second electrode of the sixth capacitor 51. A second electrode of the eighth capacitor 53 is connected to an eighth node 57 of the transfer arrangement 15.

The transfer arrangement 15 comprises the number L of switching arrangements 60 to 63 that may be identically realized. Thus, each of the number L of stages comprises a switching arrangement and two capacitors. Each of the switching arrangements 60 to 63 is coupled to one capacitor of the first series circuit of capacitors 41 and to one capacitor of the second series circuit of capacitors 42. Since in the example shown in FIG. 3A N1=N2=L=4, the transfer arrangement 15 comprises a first to a fourth switching arrangement 60 to 63.

The first switching arrangement 60 couples the input 17 of the transfer arrangement 15 to a first intermediate node 68 of the transfer arrangement 15. The first switching arrangement 60 comprises a first to a fourth switch 64 to 67. The first switch 64 couples the input 17 of the transfer arrangement 15 to the first node 23. The second switch 65 couples the first node 23 to the first intermediate node 68. Moreover, the third switch 66 couples the second node 24 to the first intermediate node 68. The fourth switch 67 couples the input 17 to the second node 24.

The second switching arrangement 61 couples the first intermediate node 68 to a second intermediate node 73. The second switching arrangement 61 is configured such as the first switching arrangement 60. The second switching arrangement 61 comprises a fifth to an eighth switch 69 to 72. The fifth switch 69 couples the first intermediate node 68 to the third node 25. The sixth switch 70 couples the third node 25 to the second intermediate node 73. Moreover, the seventh switch 71 couples the fourth node 26 to the second intermediate node 73. The eighth switch 72 couples the first intermediate node 68 to the fourth node 26.

The third switching arrangement 62 couples the second intermediate node 73 to a third intermediate node 78. The third switching arrangement 62 comprises a ninth to a twelfth switch 74 to 77.

Moreover, the fourth switching arrangement 63 comprises a thirteenth to a sixteenth switch 79 to 82. The fourth switching arrangement 63 couples the third intermediate node 78 to the output 18 of the transfer arrangement 15. The third and the fourth switching arrangement 62, 63 are realized such as the first and the second switching arrangement 60, 61. A third voltage V3 is provided at the third intermediate node 78.

The switches of the transfer arrangement 15 are realized as field-effect transistors. The switches of the transfer arrangement 15 may be realized as n-channel field-effect transistors.

The fifth and the sixth capacitor 50, 51 may both have a third capacitance value C3. The seventh and the eighth capacitor 52, 53 may both have a fourth capacitance value C4. A relationship between C1, C2, C3 and C4 may be:

$$C4<C3<C2<C1,$$

wherein C1 is the capacitance value of the two capacitors 11, 12 of the first stage 27, C2 is the capacitance value of the two capacitors 13, 14 of the second stage 28, C3 is the capacitance value of the two capacitors 50, 51 of the third stage 48, and C4 is the capacitance value of the two capacitors 52, 53 of the fourth stage 49.

For example: $8 \cdot C4 = 4 \cdot C3 = 2 \cdot C2 = C1$

The first clock signal $\Phi 1$ controls the second switch 65 of the first switching arrangement 60. Furthermore, the first clock signal $\Phi 1$ controls the corresponding switches in the further switching arrangements 61 to 63, namely the sixth switch 70 of the second switching arrangement 61, the tenth switch 75 of the third switching arrangement 62 and the fourteenth switch 80 of the fourth switching arrangement 63.

The second clock signal $\Phi 2$ controls the first switch 64 of the first switching arrangement 60. Correspondingly, the second clock signal $\Phi 2$ controls the corresponding switches in the further switching arrangements 61 to 63, namely the fifth switch 69 of the second switching arrangement 61, the ninth switch 74 of the third switching arrangement 62 and the thirteenth switch 79 of the fourth switching arrangement 63.

A third clock signal $\Phi 3$ controls the third switch 66 of the first switching arrangement 60. Correspondingly, the third clock signal $\Phi 3$ controls the corresponding switches in the further switching arrangements 61 to 63, namely the seventh switch 71 of the second switching arrangement 61, the eleventh switch 76 of the third switching arrangement 62 and the fifteenth switch 81 of the fourth switching arrangement 63.

A fourth clock signal $\Phi 4$ controls the fourth switch 67 of the first switching arrangement 60. Correspondingly, the fourth clock signal $\Phi 4$ controls the corresponding switches in the further switching arrangements 61 to 63, namely the eight switch 72 of the second switching arrangement 61, the twelfth switch 77 of the third switching arrangement 62 and the sixteenth switch 82 of the fourth switching arrangement 63.

The first clock signal $\Phi 1$ sets the switches that are controlled by the first clock signal $\Phi 1$ in a conducting state during a pulse. Correspondingly, the second to the fourth clock signal $\Phi 2$, $\Phi 3$, $\Phi 4$ set the switches that are controlled by these clock signals in a conducting state during a pulse of these clock signals.

In the pre-charging mode PP, the first and the fourth switch 64, 67 may be set in a conducting state. Thus, the first and the second capacitor 11, 12 are charged by the input voltage VIN during the pre-charging mode PP.

In the charging mode CP, the first and the second clock signal $\Phi 1$, $\Phi 2$ are generated such as shown in FIG. 1C. The third clock signal $\Phi 3$ may be realized as an OR combination of the first clock signal $\Phi 1$ and the second clock signal $\Phi 2$:

$$\Phi 3 = \Phi 1 \cap \Phi 2$$

Thus, the third clock signal Φ3 may have the pulses of the first clock signal Φ1 and of the second clock signal Φ2 in the charging mode CP.

In the charging mode CP, the fourth clock signal Φ4 constantly has the value 0. Thus, the switches controlled by the fourth clock signal Φ4 are permanently in a non-conducting state in the charging mode CP.

In FIG. 3A, the voltage converter 10 is realized as a four-stage Dickson charge pump with modified topology.

In an alternative embodiment of the pre-charging mode PP, each of the switches 64 to 67, 69 to 72, 74 to 77, 79 to 82 of the four switching arrangements 60 to 63 are set in a conducting state. Thus, at the end of the pre-charging mode PP, the output voltage VO has the value of the input voltage VIN.

Alternatively, the third clock signal Φ3 constantly has the value 1. Thus, the switches controlled by the third clock signal Φ3 are permanently in a conducting state in the charging mode CP.

Figure 3B:
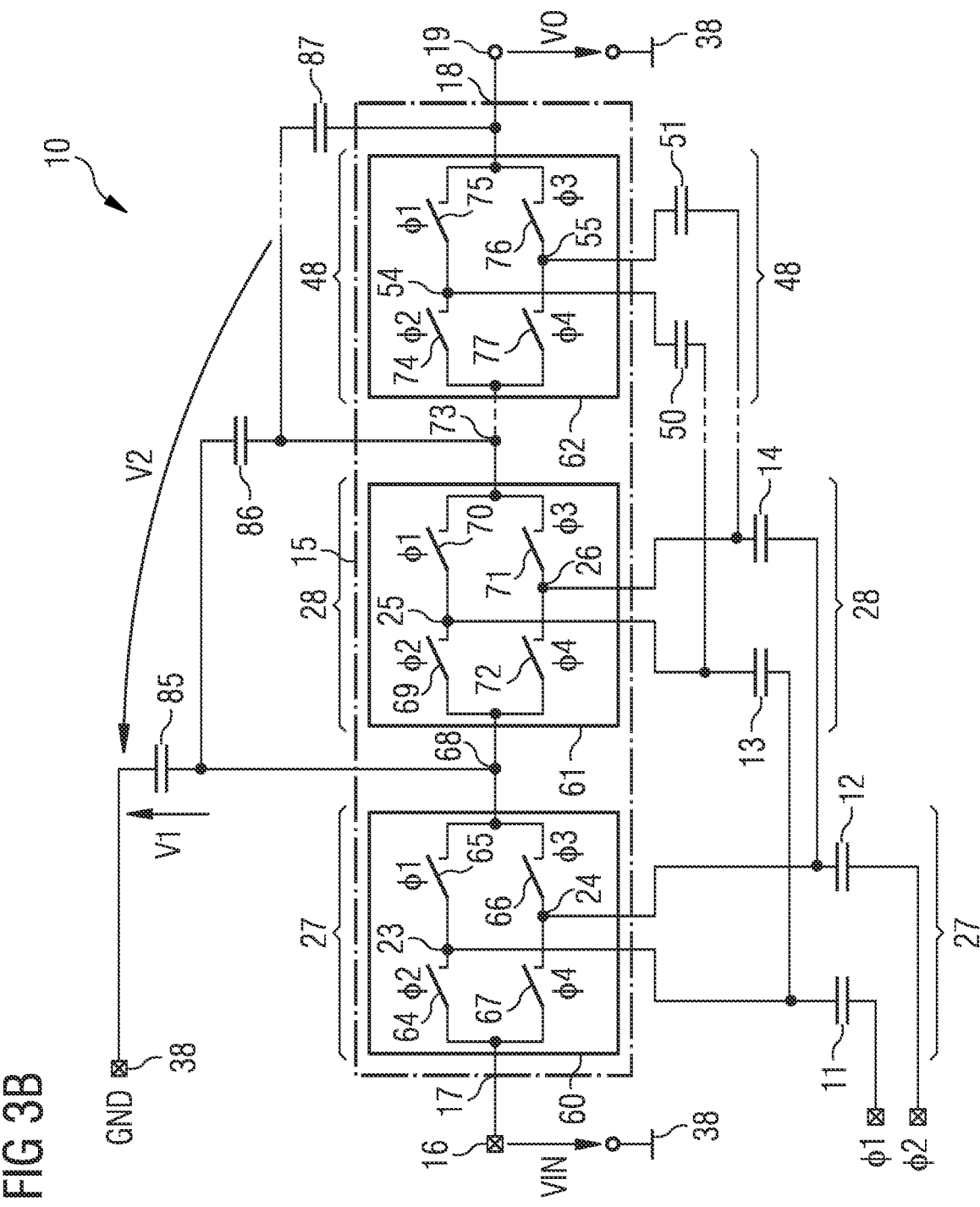

In an embodiment, the first circuit element 31 shown in FIGS. 1A, 1B and 2 is realized by the first switch 64 shown in FIGS. 3A and 3B. The second circuit element 32 is realized by the second and the third switch 65, 66. The third circuit element 33 is realized by the third and the fifth switch 66, 69. The fourth circuit element 34 is realized by the sixth and the seventh switch 70, 71. The final or fifth circuit element 35 is realized by the seventh and the ninth switch 71, 74. The switches 64-67, 69-72, 74-77, 79-82 are realized as transistors.

In an alternative not-shown embodiment, the third switch 66, the seventh switch 71, the eleventh switch 76 and the fifteenth switch 81 are replaced by conducting lines.

In an alternative not-shown embodiment, the fourth switch 67, the eight switch 72, the twelfth switch 77 and the sixteenth switch 82 can be omitted.

In an alternative not-shown embodiment, the fourth stage 49 is omitted. Thus, the third intermediate node 78 is directly connected to the output 18 of the transfer arrangement 15.

In an alternative not-shown embodiment, the third and the fourth stage 48, 49 is omitted. The second intermediate node 73 is directly connected to the output 18 of the transfer arrangement 15.

Alternatively, the switches of the transfer arrangement 15 may be realized as p-channel field-effect transistors. The clock signals Φ1 to Φ4 may be replaced by the corresponding inverse clock signals, as explained regarding FIG. 2.

In an alternative not-shown embodiment, the voltage converter 10 comprises further stages that couple the fourth stage 49 to the output 18.

In an embodiment, each of the switches 64-67, 69-72, 74-77, 79-82 or at least a subset of said switches may be set in a non-conducting state during the non-overlap times TN1, TN2.

FIG. 3B shows a further exemplary embodiment of the voltage converter 10 that is a further development of the above-shown embodiments. The voltage converter 10 comprises a first back-up capacitor 85 coupling the first intermediate node 68 to the reference potential terminal 38. Moreover, the voltage converter 10 comprises a second back-up capacitor 86 coupling the second intermediate node 73 to the first intermediate node 68. Additionally, the voltage converter 10 comprises a third back-up capacitor 87 coupling the output 18 of the transfer arrangement 15 to the second intermediate node 73. Thus, the output terminal 19 of the voltage converter 10 is coupled via a series circuit of back-up capacitors 85 to 87 to the reference potential terminal 38.

The voltage converter 10 comprises the number L of stages. The number of back-up capacitors 85 to 87 is equal to the number L of stages 27, 28, 48. The voltage converter 10 comprises the number L of back-up capacitors 85 to 87 which are arranged in a series circuit between the output terminal 19 and the reference potential terminal 38. In addition to the back-up converters 85 to 87, the voltage converter 10 comprises 2·L capacitors 11 to 14, 50, 51.

In the example shown in FIG. 3B, the number L is three (the first number N1 and the second number N2 equals 3). Thus, the voltage converter 10 comprises exactly three stages 27, 28, 48. Consequently, the transfer arrangement 15 comprises exactly three back-up capacitors 85 to 87, three switching arrangements 61 to 63 and 2·3 capacitors, namely six capacitors 11 to 14, 50, 51.

A first voltage V1 is generated between the first intermediate node 68 and the reference potential terminal 38. The first voltage V1 is tapped across the first back-up capacitor 85. A second voltage V2 is generated between the second intermediate node 73 and the reference potential terminal 38. The difference V2-V1 between the second voltage V2 and the first voltage V1 is tapped across the second back-up capacitor 86.

Advantageously, the output voltage VO does not drop across any of the capacitors 11 to 14, 50 to 53, 85 to 87. Each of these capacitors only has to withstand a portion of the output voltage VO. Thus, stress on the capacitors is reduced. A single output capacitor such as the output capacitor 37 shown in FIGS. 1A, 1B and 2 can be added to the voltage converter 10 shown in FIGS. 3A and 3B, but can be left out using the three back-up capacitors 85 to 87. Since the second back-up capacitor 86 is not connected to ground but to the first intermediate node 68, the first voltage V1 across the first back-up capacitor 85 may be approximately equal to the voltage V2-V1 across the second back-up capacitor 86. Advantageously, the voltages across the back-up converters 85, 86, 87 are equal, for example in a steady state of operation of the voltage converter 10.

FIG. 4A show an exemplary embodiment of the voltage converter 10 for illustrative purposes. The voltage converter 10 is implemented as a standard Dickson charge pump. The first electrode of the third capacitor 13 is connected to the first clock terminal 21 and is not connected to the second electrode of the second capacitor 12. Similarly, the first electrode of the fourth capacitor 14 is connected to the second clock terminal 22 and is not connected to the second electrode of the third capacitor 13. The third and the fourth capacitors 13, 14 are realized as high voltage capacitors.

FIG. 4B show an exemplary embodiment of the voltage converter 10 for illustrative purposes. A series circuit of the third capacitor 13 and a further third capacitor 100 couples the first clock terminal 21 to the third node 25. A series circuit of the fourth capacitor 14 and a further fourth capacitor 101 couples the second clock terminal 22 to the fourth node 26. A first resistor 102 is connected in parallel to the third capacitor 13. A second resistor 103 is connected in parallel to the further third capacitor 100. A third resistor 104 is connected in parallel to the fourth capacitor 14. A fourth resistor 105 is connected in parallel to the further fourth capacitor 105. A voltage across the third capacitor 13 is nearly equal to a voltage across the further third capacitor 100 due to the first and the second resistor 102, 103. The voltage converter 10 is implemented as a modified Dickson charge pump with low-voltage capacitors 11 to 14, 100, 101 and balancing resistors 102 to 105.

Figure 4C:
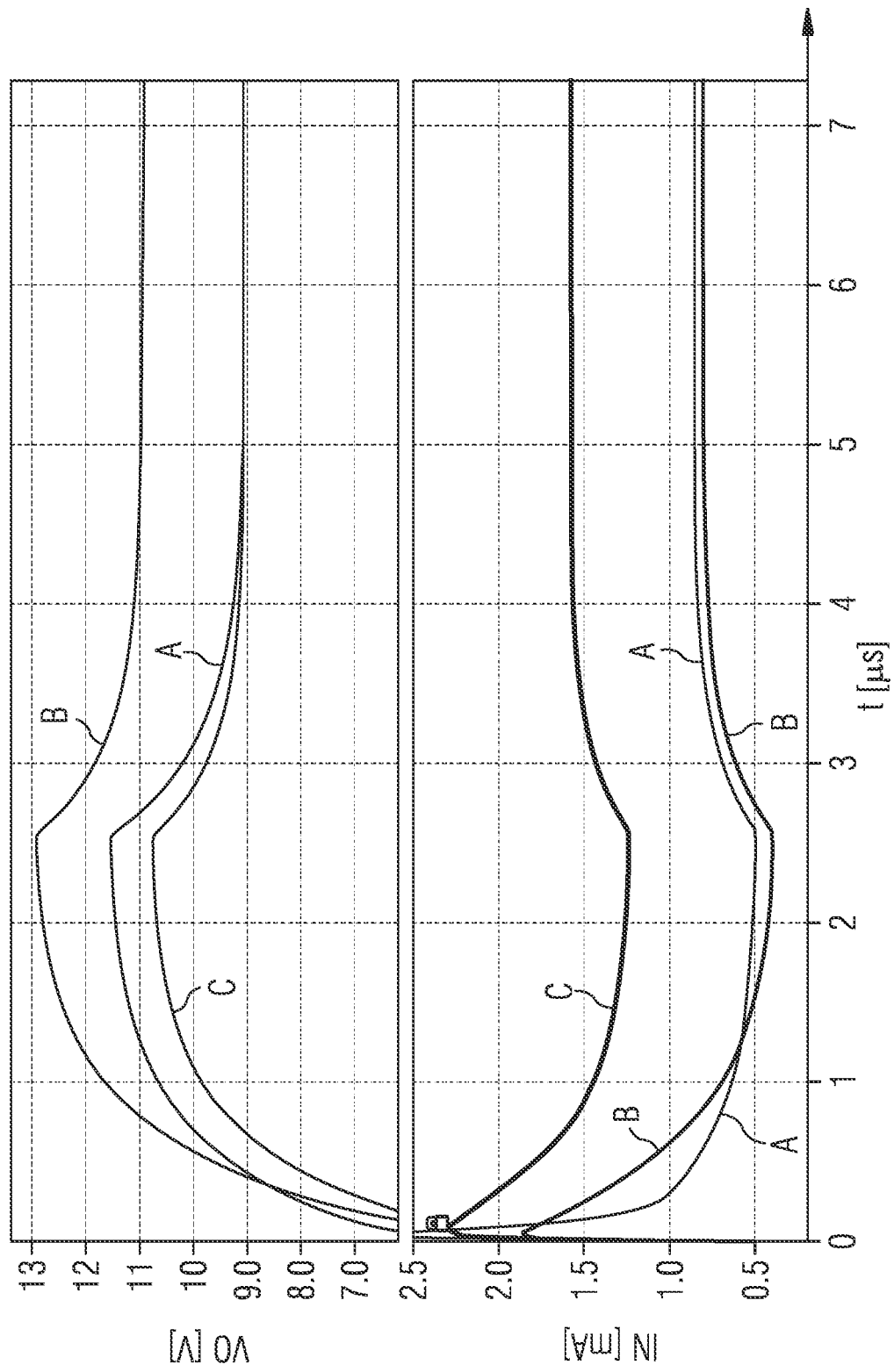

FIG. 4C shows an exemplary embodiment of signals of different voltage converters. The signals were generated by simulation. In the upper part of FIG. 4C, the output voltage VO is shown as a function of the time t. In the lower part of FIG. 4C, an input current IN flowing to the voltage converter 10 via the supply terminal 16 and the first and the second clock terminal 21, 22 is shown as a function of the time t. The curve A show the output voltage VO and the input current IN of the voltage converter 10 illustrated by FIG. 3A having four stages. Curve B shows the output voltage VO and the input current IN of a Dickson charge pump comprising high voltage capacitors as explained in FIG. 4A. Curve C shows the output voltage VO and the input current IN of a voltage converter implemented as a Dickson charge pump wherein the high voltage capacitors are replaced by stacked capacitors as illustrated in FIG. 4B. Up to the point of time t=2.6 microsecond, no load current flows through the output terminal 19 of the voltage converter 10. Thus, the output voltage VO is rising whereas the input current IN drops as a function of the time t. After t=2.6 microseconds a load current flows and thus the output voltage VO drops from the maximum value and the input current IN rises to a new steady state value of the input current IN.

According to simulation, the voltage converter 10 with four stages has a charge pump efficiency of 35.1%, an input current IN of 0.87 mA, an output voltage VO of 9.07 V and uses a capacitor array of 60 pF. Contrary to these simulation results, the standard Dickson charge pump of FIG. 4A with high-voltage capacitors achieves a charge pump efficiency of 45.3%, an input current IN of 0.81 mA, an output voltage VO of 10.96 V and uses a capacitor array of 16 pF. The Dickson charge pump with low-voltage capacitors and balancing resistors of FIG. 4B achieves a charge pump efficiency of 18.9%, an input current IN of 1.59 mA, an output voltage VO of 9.05 V and uses a capacitor array of 120 pF as well as a resistor array of 18 MOhm.

In an embodiment, the voltage converters 10 of FIGS. 1A to 1C, 2, 3A and 3B are configured as arrangements of flying capacitors without need of balancing resistors. Advantageously, a power consumption and area of balancing resistors is eliminated by the voltage converters 10 of FIGS. 1A to 1C, 2, 3A and 3B. This results in a reduced size of the capacitor array. The capacitors 50 to 53 on the right side have the same capacitance value as in the non-stacked version with high-voltage capacitors.

Figure 5:
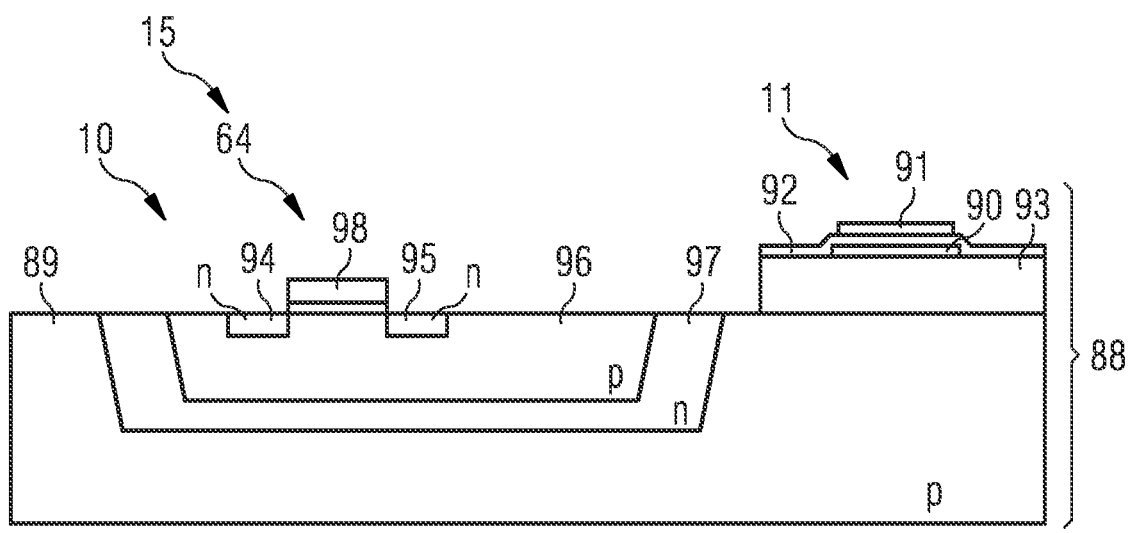
FIG. 5 shows an exemplary embodiment of a semiconductor body comprising a voltage converter.

FIG. 5 shows an exemplary embodiment of a semiconductor body 88 comprising the voltage converter 10. In FIG. 5, a cross section of the semiconductor body 88 is shown. The semiconductor body 88 comprises the transfer arrangement 15 and the capacitors 11 to 14. As an example, the first switch 64 and the first capacitor 11 is illustrated. The semiconductor body 88 comprises a semiconductor substrate 89. The capacitors 11 to 14 are fabricated as metal-isolator-metal capacitors. The first electrode of the first capacitor 11 is realized as a first conducting layer 90 and the second electrode of the first capacitor 11 is realized as a second conducting layer 91. The first and the second conducting layer 90, 91 may be realized as metal and/or polysilicon and/or silicide layers. An isolating layer 92 is arranged between the first and the second conducting layer 90, 91. The first capacitor 11 is separated from the semiconductor substrate 89 by at least a further isolating layer 93.

The not-shown output capacitor 37 may be realized as a metal-isolator-metal capacitor, metal or polysilicon to substrate capacitor or as an external capacitor outside of the semiconductor body 88.

The first switch 64 is realized as field-effect transistor. Thus, the first switch 64 comprises a source region 94, a drain region 95, a gate 98 and a channel. The source region 94, the drain region 95 and the channel are arranged in a well 96. The well is located in a deep well 97. The deep well 97 is arranged in the semiconductor substrate 89.

The first switch 64 is realized as n-channel field-effect transistor. Thus, the source region 94 and the drain region 95 are n-doped. The well 96 is fabricated as a p-well. The deep well 97 is realized as a deep n-well. The semiconductor substrate 89 is p-doped.

In an alternative embodiment, the first switch 64 is realized as p-channel field-effect transistor.

The field-effect transistor of the first circuit element 31, shown in FIG. 2, may also be realized as the field-effect transistor illustrated in FIG. 5.

The transfer arrangement 15 and the first to the fourth capacitor 11 to 14 are integrated in the semiconductor body 88. This is a result of the reduction of the voltage across the capacitors 11 to 14.

We claim:
1. A voltage converter, comprising
a first, a second and a third capacitor,
a supply terminal,
a first and a second clock terminal and
a transfer arrangement,
wherein an input of the transfer arrangement is coupled to the supply terminal and an output of the transfer arrangement is coupled to an output terminal of the voltage converter,
a first electrode of the first capacitor is connected to the first clock terminal and a second electrode of the first capacitor is connected to a first node of the transfer arrangement,
a first electrode of the second capacitor is connected to the second clock terminal and a second electrode of the second capacitor is connected to a second node of the transfer arrangement,
a first electrode of the third capacitor is permanently and directly connected to the second electrode of the first capacitor and a second electrode of the third capacitor is connected to a third node of the transfer arrangement,
wherein the first and the second capacitor both have a first capacitance value and the third capacitor has a second capacitance value, and
wherein the first capacitance value is larger than the second capacitance value.
2. The voltage converter according to claim 1, comprising a fourth capacitor having a first electrode permanently and directly connected to the second electrode of the second capacitor and a second electrode connected to a fourth node of the transfer arrangement.
3. The voltage converter according to claim 2, comprising at least a Nth capacitor having a first electrode permanently and directly connected to the second electrode of the (N−2)th capacitor and a second electrode connected to a Nth node of the transfer arrangement, wherein N is an integer larger than 4.
4. The voltage converter according to claim 1,
wherein the transfer arrangement comprises a first, a second and a third circuit element, and
wherein the first circuit element couples the supply terminal to the first node, the second circuit element couples the first node to the second node and the third circuit element couples the second node to the third node.
5. The voltage converter according to claim 4,
wherein each of the first, the second and the third circuit element is realized as a diode.

6. The voltage converter according to claim 4,
wherein each of the first, the second and the third circuit element is realized as a field-effect transistor.

7. The voltage converter according to claim 1,
wherein the transfer arrangement comprises a first switching arrangement having a first and a second switch,
wherein the first switch couples the input of the transfer arrangement to the first node and the second switch couples the first node to a first intermediate node of the transfer arrangement.

8. The voltage converter according to claim 7,
wherein the first switching arrangement comprises a third and a fourth switch, and
wherein the third switch couples the second node to the first intermediate node of the transfer arrangement and the fourth switch couples the input of the transfer arrangement to the second node.

9. The voltage converter according to claim 7,
further comprising a first back-up capacitor coupling the first intermediate node to a reference potential terminal.

10. The voltage converter according to claim 7,
wherein the transfer arrangement comprises a second switching arrangement having a fifth and a sixth switch,
wherein the fifth switch couples the first intermediate node to the third node and the sixth switch couples the third node to a second intermediate node of the transfer arrangement.

11. The voltage converter according to claim 10,
further comprising a second back-up capacitor coupling the second intermediate node to the first intermediate node.

12. The voltage converter according to claim 1,
wherein a first clock signal is applied to the first clock terminal and a second clock signal is applied to the second clock terminal,
wherein a non-overlap time is between a pulse of the first clock signal and the following pulse of the second clock signal, and
wherein a further non-overlap time is between a pulse of the second clock signal and the following pulse of the first clock signal.

13. A method for voltage conversion, comprising
providing an input voltage to an input of a transfer arrangement,
providing a first clock signal to a first electrode of a first capacitor,
providing a second clock signal to a first electrode of a second capacitor, and
tapping an output voltage at an output of the transfer arrangement,
wherein a second electrode of the first capacitor is connected to a first node of the transfer arrangement,
a second electrode of the second capacitor is connected to a second node of the transfer arrangement, and
a first electrode of a third capacitor is permanently and directly connected to the second electrode of the first capacitor and a second electrode of the third capacitor is connected to a third node of the transfer arrangement,
wherein the transfer arrangement comprises a first switching arrangement having a first and a second switch,
wherein the first switch couples the input of the transfer arrangement to the first node and the second switch couples the first node to a first intermediate node of the transfer arrangement, and
wherein a first back-up capacitor couples the first intermediate node to a reference potential terminal.

14. A method according to claim 13,
wherein pulses of the first clock signal and pulses of the second clock signal alternate.

15. A voltage converter comprising:
a first capacitor, a second capacitor and a third capacitor;
a supply terminal;
a first clock terminal and a second clock terminal; and
a transfer arrangement,
wherein the voltage converter is configured such that:
an input of the transfer arrangement is coupled to the supply terminal, and an output of the transfer arrangement is coupled to an output terminal of the voltage converter,
a first electrode of the first capacitor is connected to the first clock terminal, and a second electrode of the first capacitor is connected to a first node of the transfer arrangement,
a first electrode of the second capacitor is connected to the second clock terminal, and a second electrode of the second capacitor is connected to a second node of the transfer arrangement,
a first electrode of the third capacitor is permanently and directly connected to the second electrode of the first capacitor, and a second electrode of the third capacitor is connected to a third node of the transfer arrangement,
a first clock signal is applied to the first clock terminal and a second clock signal is applied to the second clock terminal,
a non-overlap time is between a pulse of the first clock signal and the following pulse of the second clock signal, and a further non-overlap time is between a pulse of the second clock signal and the following pulse of the first clock signal,
wherein the first and the second capacitor both have a first capacitance value and the third capacitor has a second capacitance value, and
wherein the first capacitance value is larger than the second capacitance value.

* * * * *